(12) United States Patent
Chehab et al.

(10) Patent No.: US 7,086,233 B2
(45) Date of Patent: Aug. 8, 2006

(54) BLADE TIP CLEARANCE CONTROL

(75) Inventors: Abdullatif Chehab, Oviedo, FL (US); David A. Little, Chuluota, FL (US)

(73) Assignee: Siemens Power Generation, Inc., Orlando, FL (US)

(*) Notice: Subject to any disclaimer, the term of this patent is extended or adjusted under 35 U.S.C. 154(b) by 25 days.

(21) Appl. No.: 10/722,977

(22) Filed: Nov. 26, 2003

(65) Prior Publication Data

US 2005/0109039 A1    May 26, 2005

(51) Int. Cl.
*F02C 1/00* (2006.01)

(52) U.S. Cl. ................... 60/772; 60/782; 415/116

(58) Field of Classification Search ............. 60/772, 60/782, 806, 805, 786, 799; 415/115, 116
See application file for complete search history.

(56) References Cited

U.S. PATENT DOCUMENTS

| | | | |
|---|---|---|---|
| 3,975,901 A * | 8/1976 | Hallinger et al. ............. 60/786 |
| 4,247,247 A | 1/1981 | Thebert |
| 5,035,573 A | 7/1991 | Tseng et al. |
| 5,048,288 A * | 9/1991 | Bessette et al. ............ 60/226.1 |
| 5,064,343 A * | 11/1991 | Mills ...................... 415/173.3 |
| 5,351,732 A * | 10/1994 | Mills et al. ................. 415/175 |
| 5,868,553 A | 2/1999 | Bättig |
| 6,126,390 A | 10/2000 | Bock |
| 6,152,685 A | 11/2000 | Hagi |
| 6,435,823 B1 | 8/2002 | Schroder |
| 6,502,304 B1 | 1/2003 | Rigney et al. |
| 6,863,495 B1 * | 3/2005 | Halliwell et al. ......... 415/173.1 |
| 6,925,814 B1 * | 8/2005 | Wilson et al. ................ 60/785 |

FOREIGN PATENT DOCUMENTS

| | | |
|---|---|---|
| CA | 2232781 | 10/2001 |
| EP | 0 806 548 A1 | 11/1997 |
| EP | 0806548 A1 | 11/1997 |
| EP | 1132577 A2 | 9/2001 |
| JP | 62-225703 | 10/1987 |
| JP | 62225703 A | 10/1987 |
| JP | 3-15605 | 1/1991 |
| JP | 03015605 A | 1/1991 |
| JP | 8-193503 | 7/1996 |
| JP | 08193503 A | 7/1996 |
| JP | 2000-220407 | 8/2000 |
| JP | 2000220407 A | 8/2000 |
| JP | 2001-248406 | 9/2001 |
| JP | 2001248406 A | 9/2001 |
| WO | WO 01/57420 A1 | 8/2001 |

\* cited by examiner

*Primary Examiner*—William Rodriguez

(57) ABSTRACT

Aspects of the invention relate to a turbine engine system and method for actively managing blade tip clearances during part load operation of the engine. Aspects of the invention relate to extracting a portion of the combustion gases from the combustor section of the engine and routing these heated gases to the blade rings or other stationary structure surrounding the turbine blades. Upon exposure to the combustion gases, which can be mixed with compressor exit air, the stationary structure will thermally expand, causing blade tip clearances to increase. Thus, concerns of blade tip rubbing are minimized. Once the engines achieves steady state operation, the flow of the combustion gases to the blade rings can be substantially restricted so that only compressor exit air is supplied to the stationary structure. Consequently, the stationary structure will contract and the blade tip clearances will decrease, thereby increasing the efficiency of the turbine.

16 Claims, 1 Drawing Sheet

BLADE TIP CLEARANCE CONTROL

FIELD OF THE INVENTION

The invention relates in general to turbine engines and, more particularly, to optimizing blade tip clearances during startup and part load engine operation.

BACKGROUND OF THE INVENTION

The turbine section of a turbine engine can include a rotor with discs on which a plurality of blades are attached. The blades extend radially outward from the discs and terminate in a region known as the blade tip. The blades are surrounded by a stationary support structure of the turbine, which can include an outer casing and blade rings. The space between the tips of the rotating blades and the neighboring stationary structure is referred to as the blade tip clearance.

For engine integrity, it is important that the tips of the blades do not rub against the nearby stationary structure. However, during transient conditions such as during engine startup or part load operation, it can be difficult to ensure that adequate blade tip clearances are maintained because the rotating parts (blades, rotor, and discs) and the stationary parts (outer casing, blade rings, and ring segments) thermally expand at different rates. As a result, blade tip clearances can actually decrease during engine startup or part load operation, raising concerns of blade tip rubbing. Thus, there is a need for controlling blade tip clearances when the engine operates under transient conditions such as during engine startup and part load.

SUMMARY OF THE INVENTION

Thus, one object according to aspects of the present invention is to provide a method for actively controlling blade tip clearances. Another object according to aspects of the invention is to increase blade tip clearances while the engine is experiencing substantially transient conditions such as at engine startup or during part load operation. These and other objects according to aspects of the present invention are addressed below.

In one respect, aspects of the invention relate to a method for controlling turbine blade tip clearances. The method includes operating a turbine engine. The turbine engine has a compressor section, a combustor section and a turbine section. The turbine section includes a rotor with discs on which a plurality of blades are attached. The turbine section further includes one or more stationary blade rings. At least a portion of the one or more blade rings is substantially proximate to the blades. The combustor section can include a transition for ducting combustion gases from a combustor to the turbine section.

A portion of the combustion gases are extracted from the combustor section of the turbine engine. In one embodiment, the portion of combustion gases can be extracted from the transition. The portion of combustion gases are combined with a portion of the compressor exit air to form a mixture. The temperature of the mixture is greater than the temperature of the compressor exit air as it exits the compressor. The mixture is supplied to at least one stationary blade ring. The temperature of the mixture is greater than the temperature of the blade ring. Due to its exposure to the mixture, the blade ring thermally expands such that a clearance between the tips of the blades and a neighboring stationary blade ring increases.

The above steps of can occur during part load operation of the turbine engine. Alternatively, the steps can occur during engine start up until the engine reaches from about 10% load to about 25% load. In addition, the above steps can be substantially ceased when the engine reaches substantially steady state conditions, which can include base load operation. Thus, only compressor exit air can be supplied to the at least one blade ring.

The turbine can include at least two rows of blades. In such cases, a first row of blades can be located upstream of a second row of blades. The first row of blades can be substantially proximate to a first blade ring, and the second row of blades can be substantially proximate to a second blade ring. In such case, the mixture can be discharged from the at least one stationary blade ring into the turbine flow downstream of the first row of blades. In some cases where there are multiple blade rings, the mixture is only be supplied to the first blade ring.

In another respect, aspects of the invention relate to a turbine system. The system includes a turbine engine having a compressor section, a combustor section, and a turbine section. The turbine section includes a plurality of discs mounted to a rotor. A plurality of blades are attached to the discs. A stationary blade ring surrounds at least a portion of the blades. The system further includes a channel that extends from the combustor section to the blade ring. The channel permits flow of a portion of combustion gases out of the combustor section. The channel further includes an inlet for permitting entry of a portion of compressor exit air such that the compressor exit air can mix with the combustion gases in the channel so as to cool the combustion gases. Upon exposure to the mixed combustion gases and compressor exit air, the clearance between the tips of the blades and the surrounding stationary blade ring increases.

The system can further include a valve for regulating the flow of combustion gases into the channel. The valve can substantially restrict the flow of combustion gases through the channel when the engine reaches substantially steady state operation. Substantially steady state operation can include at least base load operation. The blade ring can include an outlet for discharging the mixture of combustion gases and compressor exit air downstream of the first row of blades and into the turbine gas flow.

DETAILED DESCRIPTION OF EMBODIMENTS OF THE INVENTION

Figure 1:
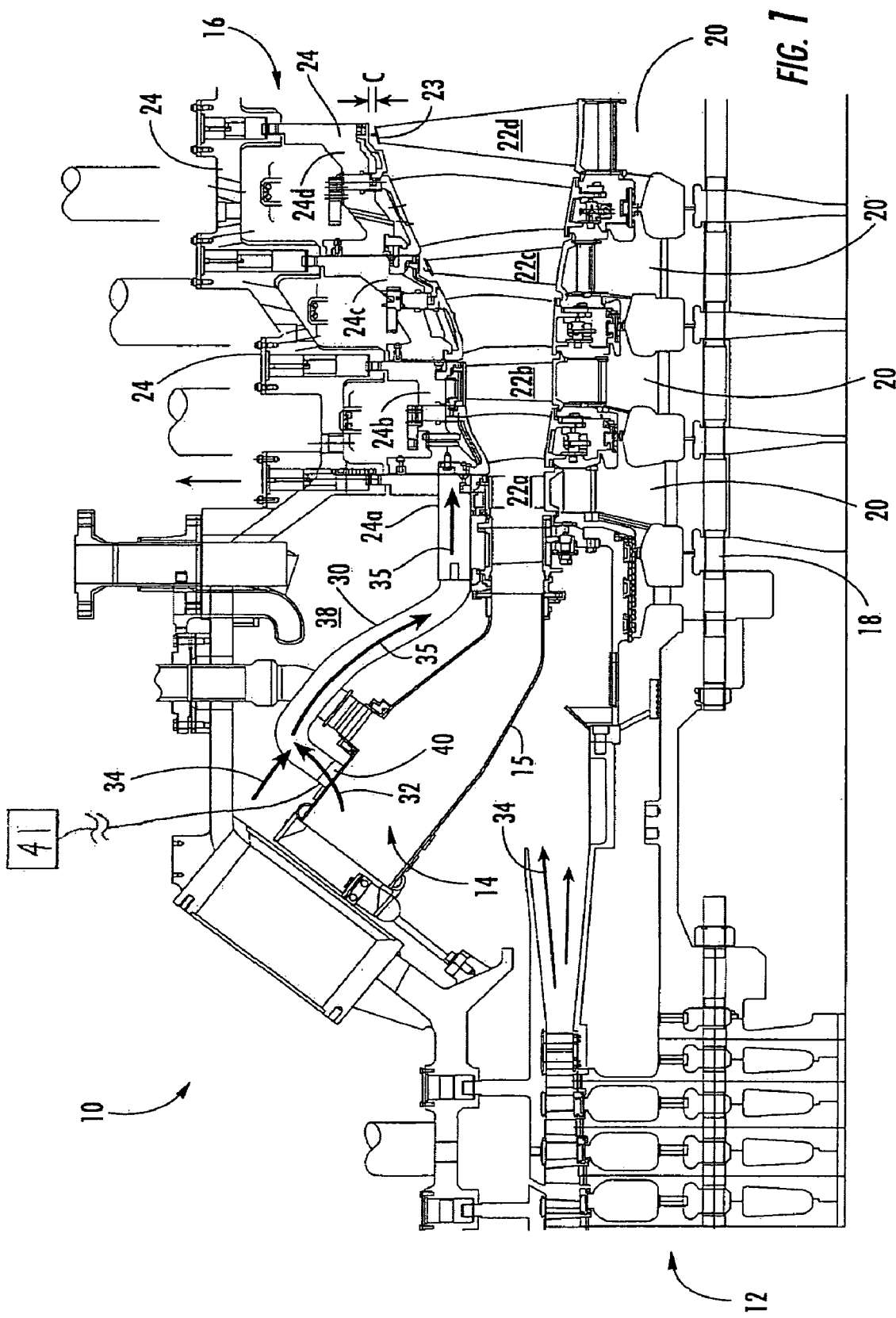
FIG. 1 is a side elevational view of one turbine engine configuration according to aspects of the present invention.

Aspects of the present invention relate to actively managing blade tip clearances while a turbine engine is operating under transient conditions such as at engine startup or during part load operation. Aspects of the invention are described in connection with a turbine engine system and a method of operation.

Embodiments according to aspects of the invention are shown in FIG. 1, but the present invention is not limited to the illustrated structure or application. Further, the following detailed description is intended only as exemplary.

Aspects of the invention can be applied to a variety of turbine engine systems. A turbine engine 10 can generally include a compressor section 12, a combustor section 14 and a turbine section 16. Each of these sections can have a variety of components and configurations as would be appreciated by one skilled in the art. For example, the combustor section 14, illustrated with a transition 15, contains hot combustion gases flowing to the turbine section 16. It should be noted that, for the sake of clarity, many of the components associated with the combustor section 14 are not shown in FIG. 1. The turbine section 16 can include a rotor 18 with discs 20 on which a plurality of blades 22a,22b,22c,22d (collectively referred to as 22) are attached. Each of blades 22 can have a tip portion 23.

Surrounding these components are a variety of stationary support structures 24 such as an outer casing, blade rings 24a,24b,24c,24d and ring segments (collectively referred to as 24). The space between the tips 23 of the blades 22 and the neighboring stationary support structure 24 is known as the blade tip clearance C. In FIG. 1, a blade tip clearance C is shown between the tips 23 of the fourth row of blades 22d and the fourth blade ring 24d. It should be noted that similar clearances are present between the first, second and third row of blades 22a,22b,22c and the substantially adjacent first, second and third blade rings 24a,24b,24c.

A turbine engine system according to the invention can further include a channel 30 extending from the combustor section 14 to at least one of the blade rings such as the blade ring 24a surrounding at least a portion of the first row of blades 22a. The channel 30 can permit flow of a portion of the combustion gases 32 out of the combustor section 14. Further, the channel 30 can include an inlet for permitting entry of a portion of the compressor exit air 34 such that the compressor exit air 34 can mix with the combustion gases in the channel 30 so as to form a mixture 35 at a desired temperature. The compressor exit air 34 can be taken from the combustor shell 38. The channel 30 can have various configurations and can be made of any of a number of materials. The channel 30 can be routed at least partially inside of the engine 10 and can include a portion that extends outside of the engine 10.

A system according to aspects of the invention can further include a valve 40 for regulating the flow of combustion gases 32 into the channel 30. Ideally, the valve 40 is configured to substantially restrict the entry of combustion gases 32 into the channel when the engine reaches substantially steady state operation such as at base load or where most of the components that impact the blade tip clearance C (blades, rotor, discs, outer casing, blade ring, etc.) have thermally grown to their final shapes. The valve 40 can be operated by the engine controller (not shown) or it can be controlled manually.

In one embodiment, the mixture 35 is only supplied to the first blade ring 24a surrounding the first row of blades 22a. In such case, the blade ring 24a can include an inlet (not shown) dedicated to receiving the mixture 35 or any other fluid in the channel 30. The blade ring 24a can further include an outlet (not shown) for discharging the mixture 35 from the blade ring 24a so as to join the gases flowing through the turbine section 16 of the engine 10. In one embodiment, the mixture 35 can be discharged downstream or otherwise behind the first row of blades 22a.

A turbine engine 10, configured as described above or otherwise, can be used in methods according to aspects of the invention so as to improve the efficiency of a turbine engine 10 by controlling blade tip clearances C. The method described herein is merely an example as not every step described need occur and, similarly, the steps described are not limited to performance in the sequence described.

In one method, a turbine engine 10, such as one described above, is operated. In basic operation, ambient air can enter the compressor section 12 where the air is compressed. After leaving the compressor section 12, the compressor exit air 34 generally flows into the combustor shell 38. A large portion of the compressor exit air 34 can be directed to the combustor section 14 of the engine 10. However, portions of the compressor exit air 34 can also be diverted for use in other areas. For example, in some turbine engine designs, a portion of the compressor exit air 34 can be supplied to the stationary support structure 24 surrounding the turbine blades 22.

Similarly, a portion of the combustion gases 32 can be extracted from the combustor section 14 of the turbine engine 10. The combustion gases 32 can be extracted from just about any part of the transition 15 of the combustion section 14. The portion of combustion gases 32 can be combined with a portion of compressor exit air 34 so as to form a mixture 35. The temperature of the combustion gases 32 is greater than the temperature of the compressor exit air 34. For example, the temperature of the combustion gases can be from about 1000 degrees Fahrenheit to about 2800 degrees Fahrenheit. The temperature of the compressor exit air can be from about 100 degrees Fahrenheit to about 800 degrees Fahrenheit. The temperature of the mixture 35 will vary depending on the ratio of combustion gases 32 to compressor exit air 34 used to create the mixture 35. In any event, the temperature of the mixture 35 is greater than the temperature of the compressor exit air 34.

The mixture 35 can be supplied to the stationary support structure 24 surrounding the rotating blades 22. For example, the mixture 35 can be supplied to at least one stationary blade ring, such as the first blade ring 24a surrounding the first row of blades 22a. The temperature of the mixture 35 will be greater than the temperature of the blade ring 24a. As a result, the blade tip clearance C, defined between the tips 23 of the blades 22a and the neighboring stationary blade ring 24a, will increase due the thermal expansion of the blade ring 24a.

The turbine section 16 can include at least two rows of blades 22. For instance, a first row of blades 22a can be located upstream of a second row of blades 22b. In such case, the first row of blades 22a can be situated substantially proximate to a first blade ring 24a and the second row of blades 22b can be situated substantially proximate to a second blade ring 24b. When there are multiple rows of blades 22 with multiple associated blades rings 24, the mixture 35 according to aspects of the invention can be supplied to one or more of the blade rings 24. In one embodiment, the mixture 35 is only supplied to the first blade ring 24a. In such case, the mixture 35 can be discharged from the first blade ring 24a downstream or behind the first row of blades 24a such that the discharged mixture 35 joins the combustion gas flow path in the turbine section 16.

The above method is especially suited for when the turbine 10 is operating under transient conditions such as during part load or during engine startup. In one embodiment, the above method can be applied to a turbine engine from the time of startup until the engine reaches from about 10% load to about 25% load. At a minimum, the above method steps can be substantially ceased once the engine 10 reaches substantially steady state conditions such as base load operation. In such case, only compressor exit air 34 can be supplied to the blade ring 24a.

While especially suited for the first row of blades 22a in a turbine, aspects of the invention can be applied to any and all rows of blades 22a,22b,22c,22d in the turbine section 16. It will of course be understood that the invention is not limited to the specific details described herein, which are given by way of example only, and that various modifications and alterations are possible within the scope of the invention as defined in the following claims.

What is claimed is:

1. A method for controlling blade tip clearances comprising the steps of:
    (a) operating a turbine engine, the turbine engine having a compressor section, a combustor section and a turbine section, the turbine section including a rotor with discs on which a plurality of blades are attached;
    (b) extracting a portion of the combustion gases from the combustor section of the turbine engine;
    (c) combining the portion of combustion gases with a portion of the compressor exit air to form a mixture, wherein the temperature of the mixture is greater than the temperature of the compressor exit air as it exits the compressor section;
    (d) monitoring at least one engine operating parameter; and
    (e) selectively supplying the mixture to at least one stationary blade ring based on the at least one engine operating parameter, wherein at least a portion of the at least one blade ring is substantially proximate to the blades, wherein the temperature of the mixture is greater than the temperature of the at least one blade ring, wherein said mixture supplying is performed automatically by an engine controller,
    whereby exposure to the mixture causes thermal expansion of the blade ring such that the clearance between the tips of the blades and a neighboring stationary blade ring increases.

2. The method of claim 1 wherein the combustor section includes a transition for ducting combustion gases from the combustor section to the turbine section, wherein the portion of combustion gases are extracted from the transition.

3. The method of claim 1 wherein the turbine include at least two rows of blades, wherein a first row of blades is located upstream of a second row of blades, the first row of blades being substantially proximate to a first blade ring and the second row of blades being substantially proximate to a second blade ring.

4. The method of claim 3 wherein the mixture is only supplied to the first blade ring.

5. The method of claim 3 further comprising the step of:
    (f) discharging the mixture from the at least one stationary blade ring into the turbine flow downstream of the first row of blades.

6. The method of claim 1 wherein steps (b), (c), and (e) occur during part load operation of the engine.

7. The method of claim 1 wherein steps (b), (c), and (e) occur during engine start up until the engine reaches from about 10% load to about 25% load.

8. The method of claim 1 further comprising the step of:
    (g) substantially ceasing steps (b), (c), and (e) when the engine reaches substantially steady state conditions and supplying only compressor exit air to the at least one blade ring.

9. The method of claim 8 wherein substantially steady state conditions include base load operation.

10. A turbine system comprising
    a turbine engine having a compressor section, a combustor section, and a turbine section, the turbine section including a plurality of discs mounted to a rotor, wherein a plurality of blades are attached to the discs and a stationary blade ring surrounds at least a portion of the blades;
    a channel extending from the combustor to the blade ring, wherein the channel permits flow of a portion of combustion gases out of the combustor section, the channel further including an inlet for permitting entry of a portion of compressor exit air such that the compressor exit air can mix with the combustion gases in the channel so as to cool the combustion gases;
    a valve for selectively regulating the flow combustion gases into the channel; and
    an engine controller operatively connected to the valve, wherein the engine controller automatically operates the valve,
    whereby the clearance between the tips of the blades and the surrounding stationary blade ring increases upon exposure to the mixture of combustion gases and compressor exit air.

11. The turbine system of claim 10 wherein the controller operates the valve so as to substantially restricts flow of combustion gases through the channel when the engine reaches substantially steady state operation.

12. The system of claim 11 wherein substantially steady state operation includes at least base load operation.

13. The turbine system of claim 10 wherein the blade ring includes an outlet for discharging the mixture of combustion gases and compressor exit air downstream of the first row of blades and into the turbine gas flow.

14. The turbine systems of claim 10 wherein the blade ring includes an outlet for discharging the mixture of combustion gases and compressor exit air downstream of the first roe of blades and into the turbine gas flow.

15. A turbine system comprising
    a turbine engine having a compressor section, a combustor section, and a turbine section, the turbine section including a plurality of discs mounted to a rotor, wherein a plurality of blades are attached to the discs and a stationary blade ring surrounds at least a portion of the blades; and
    a channel extending from the combustor to the blade ring, wherein the channel permits flow of a portion of combustion gases out of the combustor section, the channel further including an inlet for permitting entry of a portion of compressor exit air such that the compressor exit can mix with the combustion gases in the channel so as to cool the combustion gases,
    a manual-operable valve for selectively regulating the flow of combustion gases into the channel;
    whereby the clearance between the tips of the blades and the surrounding stationary blade ring increases upon exposure tot the mixture of combustion gases and compressor exit air.

16. A method for controlling blade tip clearances comprising the steps of:
    (a) operating a turbine engine, the turbine engine having a compressor section, a combustor section and a turbine section, the turbine section including a rotor with discs on which a plurality of blades are attached;
    (b) extracting a portion of the combustion gases from the combustor section of the turbine engine;
    (c) combining the portion of combustion gases with a portion of the compressor exit air to form a mixture, wherein the temperature of the mixture is greater than the temperature of the compressor exit air as it exits the compressor section;
    (d) monitoring at least one engine operating parameter; and
    (e) selectively supplying the mixture to at least one stationary blade ring based on the at least one engine operating parameter, wherein at least a portion of the at least one blade ring is substantially proximate to the blades, wherein the temperature of the mixture is greater than the temperature of the at least one blade ring, wherein said mixture supplying is performed manually, whereby exposure to the mixture causes thermal expansion of the blade ring such that the clearance between the tips of the blades and a neighboring stationary blade ring increases.

* * * * *